(12) United States Patent
Hawighorst et al.

(10) Patent No.: US 7,707,680 B2
(45) Date of Patent: May 4, 2010

(54) DRIVE DEVICE FOR WINDOW WIPERS WITH A PARKING POSITION SWITCH

(75) Inventors: Achim Hawighorst, Buehlertal (DE); Armin Stubner, Buehl-Altschweier (DE)

(73) Assignee: Robert Bosch GmbH (DE)

( * ) Notice: Subject to any disclaimer, the term of this patent is extended or adjusted under 35 U.S.C. 154(b) by 1095 days.

(21) Appl. No.: 10/569,392

(22) PCT Filed: Jun. 2, 2004

(86) PCT No.: PCT/DE2004/001121

§ 371 (c)(1),
(2), (4) Date: Feb. 22, 2006

(87) PCT Pub. No.: WO2005/025952

PCT Pub. Date: Mar. 24, 2005

(65) Prior Publication Data

US 2006/0284584 A1    Dec. 21, 2006

(30) Foreign Application Priority Data

Aug. 27, 2003   (DE)   ................. 103 39 316

(51) Int. Cl.
*A47L 1/00* (2006.01)

(52) U.S. Cl. .................. 15/250.17; 15/250.16

(58) Field of Classification Search .............. 15/250.17, 15/250.16, 250.13, 250.12, 250.3; 318/441–445, 318/DIG. 2; 74/25, 425, 469, 471 R
See application file for complete search history.

(56) References Cited

U.S. PATENT DOCUMENTS

| 3,829,925 | A | * | 8/1974 | Kirkland et al. | .......... 15/250.17 |
| 5,068,500 | A | * | 11/1991 | Kitada | ..................... 200/19.01 |
| 6,199,438 | B1 | * | 3/2001 | Ade et al. | ...................... 74/25 |
| 6,944,906 | B2 | * | 9/2005 | Moein et al. | ............... 15/250.3 |

FOREIGN PATENT DOCUMENTS

| DE | 195 48 824 | 7/1997 |
| DE | 198 37 980 | 2/2000 |
| EP | 0 359 227 | 3/1990 |
| JP | 03-67754 | 3/1991 |
| WO | WO 97/24245 | 7/1997 |

* cited by examiner

*Primary Examiner*—Dung Van Nguyen
(74) *Attorney, Agent, or Firm*—Michael Best & Friedrich LLP (57) ABSTRACT

The device comprises an output gearwheel (6), a gear cover (4) having a plastic sleeve open toward the output gearwheel (6) and a park position switch having first contacts mounted for rotation and second contacts fixed to the gear cover (4) and a driving means. The invention provides that the sleeve is embodied as a contact sleeve (8) having contact tracks (31*b*, 53*a*, 31), particularly along the inner surface of the contact sleeve (8). To enable sliding contact on rotation, the cylindrical member (10) of a driving disk (9) extends into the contact sleeve (8).

19 Claims, 5 Drawing Sheets

DRIVE DEVICE FOR WINDOW WIPERS WITH A PARKING POSITION SWITCH

BACKGROUND OF THE INVENTION

The invention relates to a drive device for a windshield wiper having an output gear, a gear cover on which is formed a plastic sleeve that is open toward the output gearwheel, and a park position switch comprising first contacts mounted for rotation and second contacts fixed to the gear cover and in sliding contact with the first contacts, such that the contacts mounted for rotation are connected to the output gear via a driving means.

A drive device of this type is disclosed in German Laid Open Application DE 195 48 824 A1.

Drive devices for windshield wipers have switches that ensure that the motor of the drive device continues to be supplied with current after the driver opens the master switch until the windshield wiper has returned to its initial position, which is also referred to as the park position. Accordingly, the switch is called the park position switch.

The park position switch is conventionally implemented as a switching disk having three concentric, partially interrupted contact tracks. A point-like contact element (contact lug) slides along each track to produce an electrically conductive connection to the contact track. The contact tracks or the switching disk are fixed or connected to the output gearwheel of the output spindle, whereas the contact lugs are fixed to the housing, particularly the gear cover.

In this arrangement, in which one element of the park position switch, typically the contact tracks rotating together with the output gearwheel, is fixed to the output spindle, the following problem occurs:

The windshield wiper blade may be prevented from reaching its park position by external influences, e.g., snow on the windshield. However, because the output spindle continues to be driven by the motor until it reaches an angular position that corresponds to the park position of the wiper blade if movement is unimpeded, the wiper arm and the wiper blade are bent by being braced against the obstruction. As soon as the motor switches off automatically, the tension of the wiper is released, so that the output spindle reverses. As a consequence, the park position switch is closed again and the motor is supplied with current. This has the result that the wiper is again driven against the obstacle and mechanical tension builds again. This process is repeated until the obstacle is removed. This obviously causes substantial loading of the gear and thereby reduces the life of the gear.

To solve this problem, the generic drive device is equipped with a snow load safety mechanism, i.e., the park position switch has a supplementary driving means, so that the contacts mounted for rotation are no longer fixed to the output gearwheel but are connected to it via a coupling. This coupling is configured in such a way that the output spindle carries the switching disk along in normal operation, when the wiper is moved back and forth, so that the park position switch works like a park position switch whose switching disk is fixed to the drive spindle. In the above-described case, however, where the drive spindle is reset against its actual direction of rotation, even by the force of the wind, for example, the switching disk is not carried along, so that the park position switch, which would otherwise again supply the motor with current, is not closed.

To obtain a flat construction in connection with a driving means of this type, the aforementioned laid open application furthermore proposes that the contact element mounted for rotation be supported on a plastic sleeve formed on the gear cover and that the drive spindle extend into this sleeve.

Accordingly, from the driving means perspective alone, the contact lugs in the generic device, preferably in the embodiments with rotatable contact paths, could also be mounted for rotation. All the prior-art drive devices have in common, however, that in each case a first plane or contact disk mounted for rotation results, which is in sliding contact with a second, parallel contact plane typically formed by a flat part of the inside of the gear cover. This conventional parallel configuration places significant limits on the design and is also not fully satisfactory in other respects.

SUMMARY OF THE INVENTION

Thus, the object of the invention is to provide an improved drive device of the above-described type.

Thus, in a drive device of the above-described type with a park position switch according to the invention it is first of all provided that the sleeve is embodied as a contact sleeve for contacting the contacts mounted for rotation, such that contact tracks are provided on the contact sleeve, and at least one of the contact tracks is disposed on the inner surface of the contact sleeve. It is furthermore provided that the driving means comprises a driving disk having a centrally mounted cylindrical member and contact lugs, such that at least one of the contact lugs is formed on the surface of the cylindrical member. According to the invention, the cylindrical member extends into the contact sleeve, so that the contact lugs of the driving disk, which rotates together with the output gearwheel, slidingly engage the contact tracks of the contact sleeve. This results in a park position switch with a snow load safety mechanism that is space saving, has high contact stability and is variable in design. In particular, it is possible according to the invention to essentially integrate the park position switch contact system comprising the contact tracks and the contact lugs into the gear cover.

A particularly advantageous embodiment of this drive device provides for three contact tracks on the contact sleeve and two electrically interconnected contact lugs on the driving disk, which are configured and disposed in such a way that as the driving disk rotates a first contact lug slides continuously on a first contact track and a second contact lug slides alternately on a second and a third contact track of the contact sleeve. This simplified slider system with only two contact lugs is inexpensive and not susceptible to malfunction.

A slider system of this type may be realized in a simple manner in connection with the sleeve/cylinder geometry underlying the invention by configuring the second and third contact tracks as segments of an annular orbit interrupted only by mutual insulation, along which the second contact lug moves slidingly and alternately contacts the second and third contact tracks.

It is further advantageous if all three contact tracks are disposed on the inner surface of the contact sleeve and, accordingly, both contact lugs are formed on the surface of the cylindrical member.

In one advantageous embodiment of an "inner contacting" of this type, the second and third contact tracks are configured as an annular orbit interrupted only by mutual insulation, extending along an inner lateral surface of the contact sleeve, about the axis of the contact sleeve, and the second contact lug associated with the second and third contact tracks is formed and disposed on the lateral surface of the cylindrical member such that it moves along the orbit, as the driving disk rotates, and alternately slides on the second and third contact tracks.

For a contactability that is simple to realize from a production standpoint, it is advantageous in this and other embodiments if the first contact track is formed on the inner end face of the contact sleeve and the associated first contact lug on the top surface of the cylindrical member.

It is equally possible, however, that the first contact track is formed in an annularly closed manner on an inner lateral surface of the contact sleeve about the axis of the contact sleeve and the second and third contact tracks are also formed on an inner lateral surface of the contact sleeve about the axis of the contact sleeve, axially offset relative to the first contact track, in the form of an annular orbit that is interrupted only by the mutual insulation. Accordingly, the first contact lug associated with the first contact track is formed and disposed on the lateral surface of the cylindrical member such that it moves on the annularly closed first contact track as the driving disk rotates and thereby slides continuously on the first contact track. It is further provided that the second contact lug associated with the second and third contact tracks is formed and disposed on the lateral surface of the cylindrical member such that it moves along the orbit as the driving disk rotates and alternately slides on the second and third contact tracks.

However, the invention is not limited to the principle of "inner contacting." As an alternative, the second and third contact tracks may be configured as an annular orbit that is disposed on the open rim of the contact sleeve and is interrupted only by the mutual insulation. The contact tracks can thus also be formed outside the inner space of the contact sleeve. In this case, the second contact lug associated with the second and third contact tracks advantageously extends axially from the surface of the driving disk far enough to the rim area of the contact sleeve that it moves along the orbit as the driving disk rotates and alternately slides on the second and third contact track.

BRIEF DESCRIPTION OF THE DRAWINGS

Other advantages and embodiments of the invention will now be described in greater detail with reference to the examples depicted in the drawing figures, in which.

DETAILED DESCRIPTION

Figure 1:
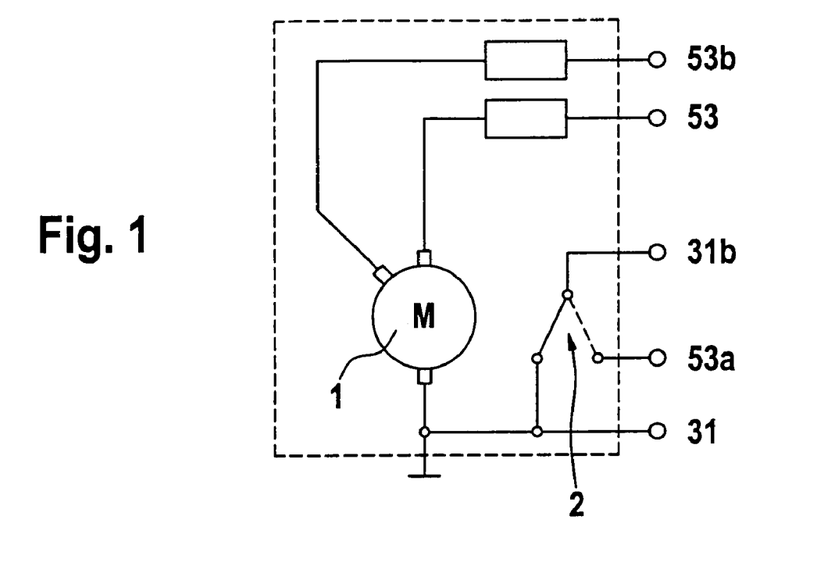
FIG. 1 is a circuit diagram of the park position switch of the drive device according to the invention.

FIG. 1 is a circuit diagram illustrating the electrical functions of a park position switch of a windshield wiper drive for cleaning a windshield of a motor vehicle. The figure shows an only schematically indicated electric drive motor 1, which has three electrical connections. A ground connection runs to a terminal 31 and thus to a negative pole of a vehicle battery (not depicted) or to a vehicle ground. A terminal 53 leads to a positive pole of the vehicle battery via a steering column switch (not depicted) if the drive motor 1 is to run in a first, i.e., a slower gear. If the drive motor 1 is to be operated in a faster, second gear, a shunt winding of the drive motor 1 is additionally connected to a terminal 53b, as depicted.

The park position switch, which is also depicted in FIG. 1, is intended to ensure reliable and exact placement of the wiper in the park position. This switch is essentially realized by a contact system that has three contact tracks 31b, 53a and 31 fixed to the housing, which are formed on the switch-side contact points of the corresponding terminals and for the sake of clarity are hereinafter provided with the same reference numerals as the corresponding terminals, and with two contact lugs (depicted in greater detail in the following figures), which rotate together with the output gearwheel and correspond to the contact points of the bridge circuit 2 in FIG. 1.

The position of the bridge circuit 2 shown in FIG. 1 corresponds to the final park position. The park position operation that occurs prior to reaching this park position starts with the steering column switch being set to a zero position (for further details of the circuit see, for example, German Laid Open Application DE 198 37 980 A1). Since the wipers are not yet in their end position, the drive motor 1 must continue to run until the wipers have reached their park position. To this end the drive motor 1 is provided with a contact system comprised of contact tracks and contact lugs, which enables a current to flow from a terminal 31b to a terminal 53a in all wiper positions except the end position and thus establishes an electrical connection from the positive pole of the vehicle battery to the connection 53 of the drive motor 1 via a contact bridge in the steering column switch—which is still in zero position. The bridge circuit 2 thus first connects terminal 31b to terminal 53a. As a result, the drive motor 1 continues to run even after it has been manually switched off and the wiper approaches its park position. As it arrives at the park position, the current flow between these two terminals is already interrupted (the second contact lug no longer slides on the contact track 53a, see below), but the drive motor 1 continues to run because of its inertia. As a result, the co-rotating contact lug also continues to run until a connection is established between the terminals 31b and 31 via the bridge circuit 2. The drive motor 1, which is short circuited as a result, is thus actively (electromagnetically) slowed down and comes to a stop as desired in the final park position. The motion sequence of the sliding contact system underlying these processes will be described in greater detail with reference to FIGS. 3 to 12.

Figure 2:
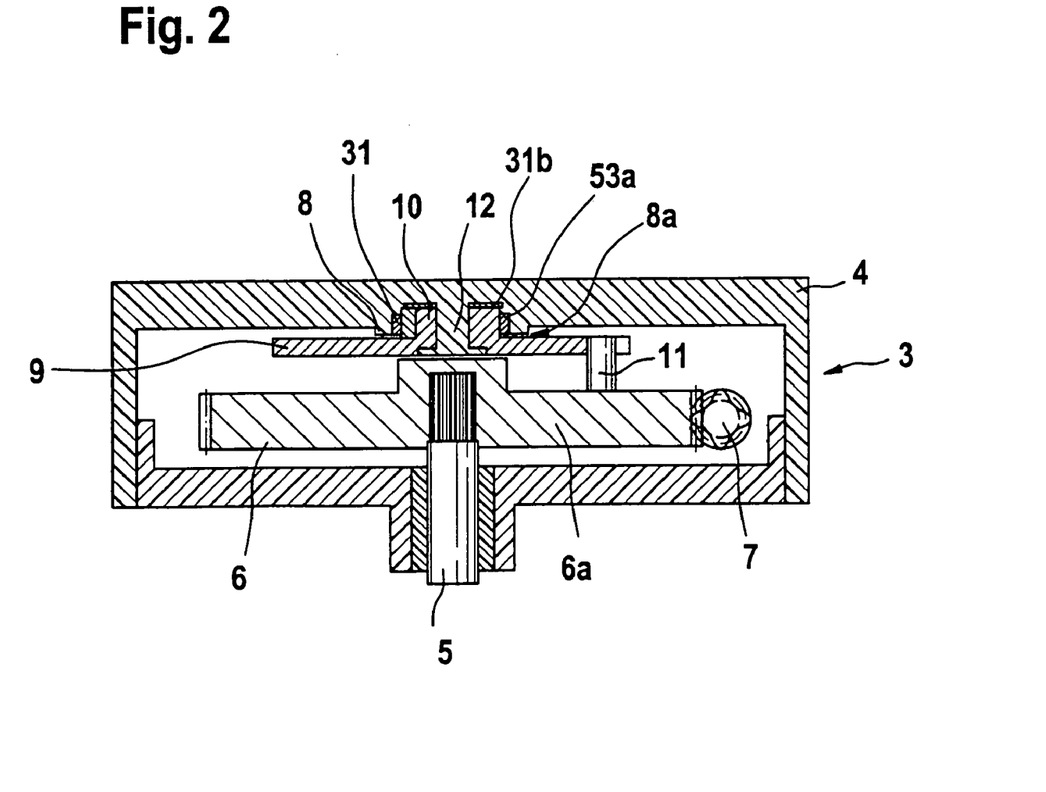
FIG. 2 is a cross section of the gear unit, the park position switch and the driving means of the drive device.
Figure 6:
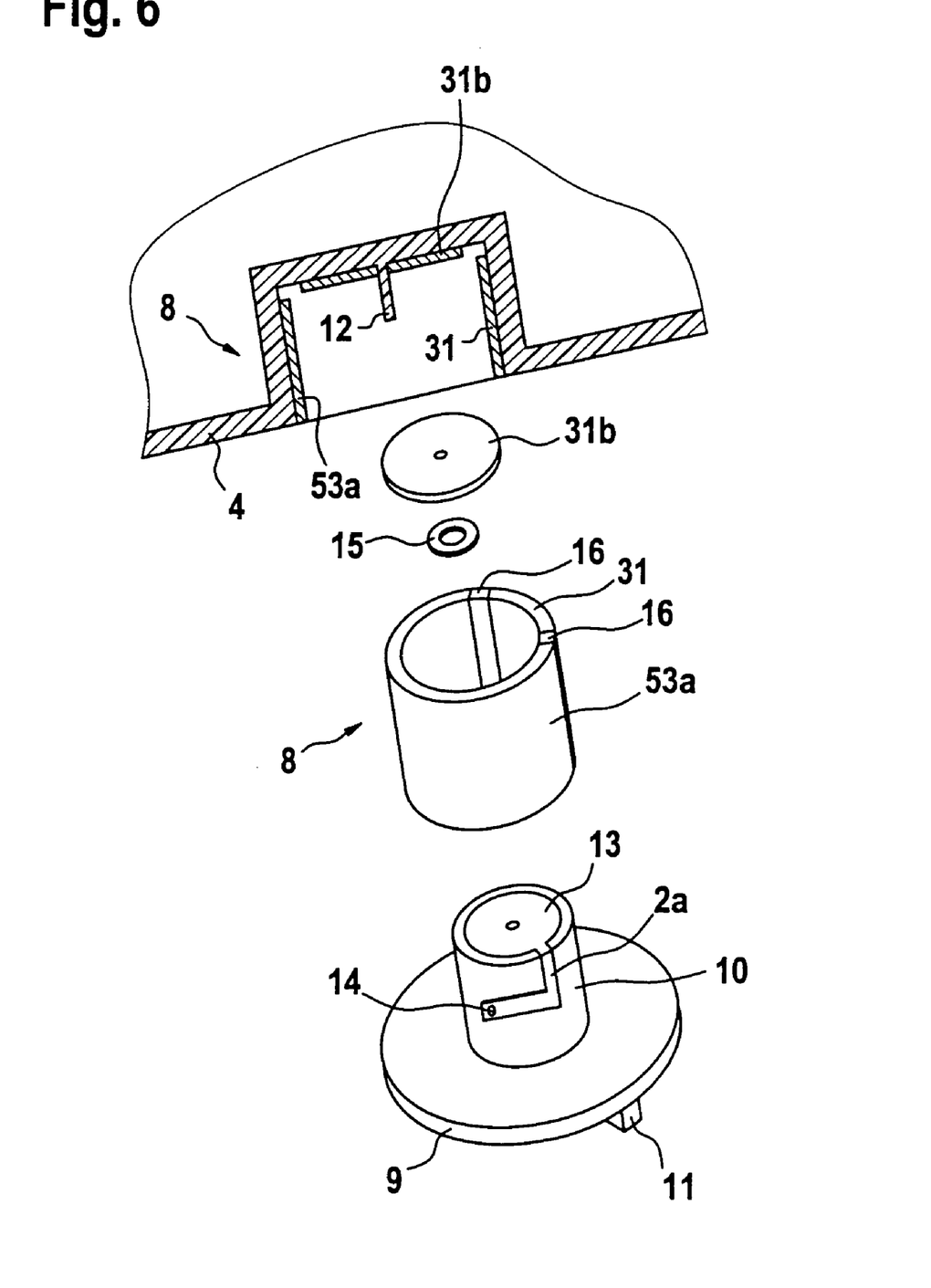
FIG. 6 is an exploded view of another embodiment of the invention with a contact system having a contact sleeve and a driving disk.
Figure 7:
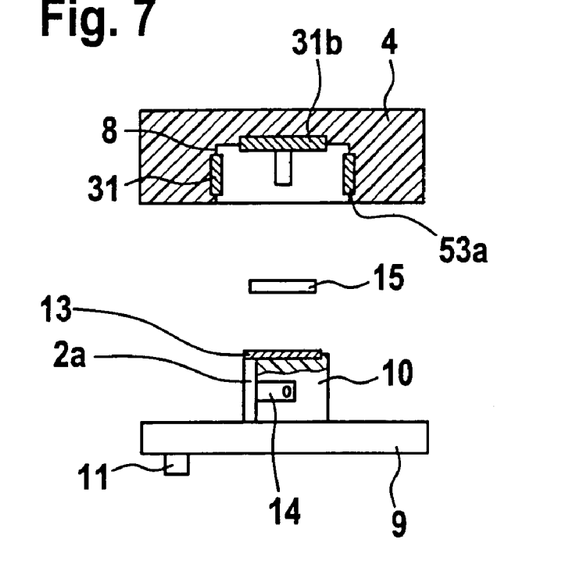
FIG. 7 is a schematic cross sectional representation of the essential parts of the contact system shown in FIG. 6.
Figure 8:
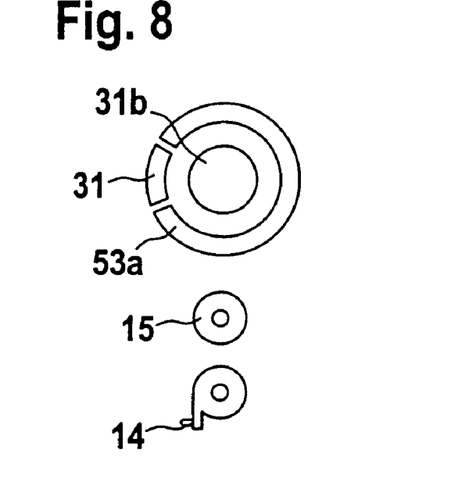
FIG. 8 is a top view of the contact system shown in FIG. 7.

FIG. 2 shows the schematic construction of an embodiment of the park position switch that essentially corresponds to the embodiment illustrated in FIGS. 6 through 8. FIG. 2 shows a cup-shaped gear housing 3, whose open side is closed by a gear cover 4. A driven spindle 5 extends through the floor of the housing 3. A plastic output gearwheel 6 is mounted to the spindle end extending into the housing 1. The gearwheel 6 has a cap-like section 6a extending beyond the end face of the spindle 5 which protrudes into the housing 3. The radial extent of the output gearwheel 6 corresponds approximately to the inside diameter of the housing 3. The external teeth (not depicted) of the gearwheel 6 mesh with a worm 7, which is configured as a direct extension of the armature spindle of the drive motor 1 (not depicted).

The gear cover 4 may be made of plastic, on which is integrally formed a contact sleeve 8, which extends axially into the interior of the housing 3. However, the gear cover 4 may also be made of a metal base plate and a plastic coating which extends substantially along the exterior of the base plate and is integrally formed with the contact sleeve 8. As a variant of the embodiment shown in FIG. 2, the contact sleeve 8 in the gear cover 4 may also be configured in such a way that it curves cap-like toward the exterior of the cover 4, while the open rim 8*a* of the sleeve 8 is aligned more or less flat with the inside of the gear cover 4.

A cylindrical member 10, which is attached in the center of a driving disk 9, extends into the space formed within the contact sleeve 8. The driving disk 9 is coupled to the output gearwheel 6 in a manner known per see, e.g. via a driving tab 11 on the output gearwheel 6 and a corresponding groove (not depicted) on the underside of the driving disk 9, or vice versa, such that when the output shaft 5 rotates in one direction, the driving disk 9—and thus the contacts fixed thereto, i.e. mounted for rotation relative to the contact sleeve 8—are carried along, and when the shaft 5 rotates in the other direction the driving disk 9 is not carried along.

In the region of the contact sleeve 8, contact tracks 31*b*, 53*a* and 31 are formed, which, as the driving disk 9 rotates, are in sliding contact with the contacts mounted for rotation, i.e., the contact lugs (not visible in FIG. 2), in a manner that will be described in greater detail below. To mount the cylindrical member 10 or the entire driving disk 9 for rotation, an axial bore in the driving disk 9 and a mount 12 extending from the gear cover 4 through this bore may be provided as shown.

Figure 3:
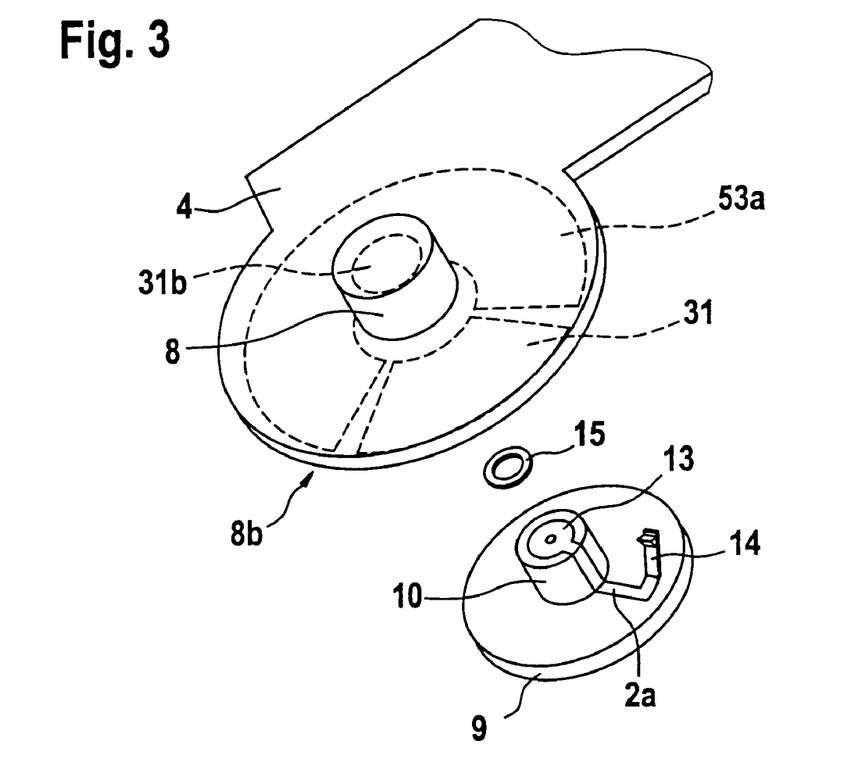
FIG. 3 is an exploded view of a contact system with contact sleeve and driving disk for the park position switch of a drive device according to the invention.

FIG. 3 shows a representation of the contact sleeve 8 and the driving disk 9 in an exploded view for improved clarity. Depicted is a contact sleeve 8 curved upwardly from the contour of the gear cover 4. A first contact track 31*b* is formed on the inner end face of the contact sleeve 8. Around the open rim of the contact sleeve 8, i.e., on the side of the cover 4 facing away from the viewer or toward the contact disk 9, a flat area 8*b* is set off in which is disposed a second contact track 53*a* in the form of a circular orbit segment. In the gap between the ends of the circular orbit segment 53*a*, a third contact track 31 is inserted, i.e. also in the form of a circular orbit segment, which is insulated relative to the second contact track 53*a* adjoining the two ends. Overall, the circular orbit segments, which complement each other to form a ring, form an orbit in the region of the open rim of the contact sleeve 8, which alternately consists, respectively, of the second and the third contact tracks 53*a* and 31.

On the top surface of the cylindrical member 10 of the driving disk 9 shown in FIG. 3 is disposed a flat first contact lug 13, which is electrically connected with a second contact lug 14 via a link 2*a*. The second contact lug 14 axially protrudes somewhat from the driving disk 9 toward the planar region 8*b* on the gear cover 4, so that when mounted it can contact the orbit 53*a*, 31 on the gear cover. The contact lugs 13 and 14 and the link 2*a* may be made of 0.5 mm thick strip steel, for example. The contact lug 14, which can be made flexible to the desired degree, is preferably bent at a right angle at its end and abrasion-resistant. Also shown in FIG. 3 is a spring washer 15, which when the cylindrical member 10 is inserted into the contact sleeve 8 creates a tolerance insensitive electrical connection between the first contact track 31*b* and the first contact lug 13.

Figure 4:
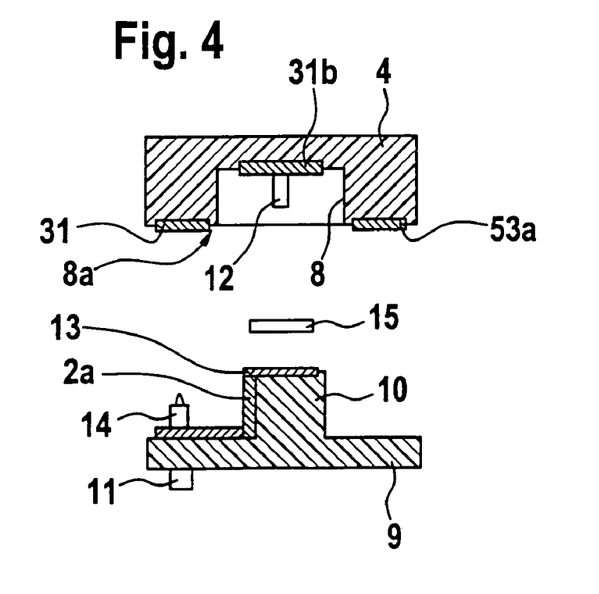
FIG. 4 is a schematic cross sectional representation of the essential parts of the contact system shown in FIG. 3.
Figure 5:
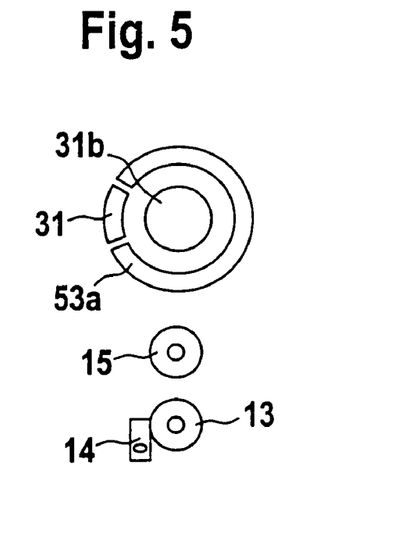
FIG. 5 is a top view of the contact system shown in FIG. 4.

The functioning of the contact system depicted in FIG. 3 as a park position switch is best understood when viewing FIGS. 4 and 5 together, which schematically show the identical contact system from different perspectives. When assembled and when the output gearwheel 6 rotates in normal direction, the first contact lug 13 continuously slides on the first contact track 31*b* of the contact sleeve 8 by means of the intervening spring washer 15, while the second contact lug 14 moves along the orbit around the rim 8*a* of the contact sleeve 8 and thus slides alternately on the second and the third contact tracks 53*a* and 31. Accordingly, the drive motor initially continues to run in park position mode—i.e. with the steering column switch in zero position—as long as the second contact lug 14 slides on the second contact track 53*a*. When the driven wiper approaches the park position, the second contact lug 14 correspondingly reaches the gap in the second contact track 53*a*, the motor is shut off, and the second contact lug 14 continues to move a little further corresponding to the inertia of the drive system and slides over the third contact track 31. As a result the motor is short circuited as described above, and the wiper and, by means of the driving disk 9, also the second contact lug 14 are slowed down. The stopping position of the second contact lug 14 on the third contact track 31 corresponds to the stopping of the wiper in the park position.

The contact tracks 31*b*, 53*a* and 31 may be applied, for example, in the form of grid-like contact structures or pressed screens in the area of the contact sleeve 8 or they may be produced by injection molding around plate-like insert structures in the gear cover 4. The required electrical connections or track conductors may be similarly realized.

FIGS. 6 to 12 show different embodiments in which, however, the three contact tracks 31*b*, 53*a* and 31 are each disposed on the inner surface of the contact sleeve 8 and, correspondingly, the two contact lugs 13 and 14 are formed on the surface of the cylindrical member 10.

This may be realized, for example, with the arrangement illustrated in FIGS. 6 to 8. In this embodiment, the first contact lug 13 is again in continuous sliding contact via a spring washer 15 with the first contact track 31*b* formed on the end face of the contact sleeve 8. For better understanding and in addition to the actual exploded view depicted in the lower portion of FIG. 6, the upper portion of the figure shows the contact sleeve 8 with the three contact tracks 31*b*, 53*a* and 31. The sleeve-like contact structure of the two segments 53*a* and 31, which are separated by the insulation 16 but as a whole form an annular orbit, is shown underneath the spring washer 15. On the lateral surface of the cylindrical member 10 mounted in the center of the driving disk 9 may be seen as the second contact lug 14, which is connected to the first contact lug 13 via a link 2*a* and which moves around the orbit as the driving disk 9 rotates and slides on the second and third contact tracks 53*a* and 31, respectively. FIGS. 7 and 8 show the same conditions in a schematic and easy-to-follow manner from a different perspective.

Figure 9:
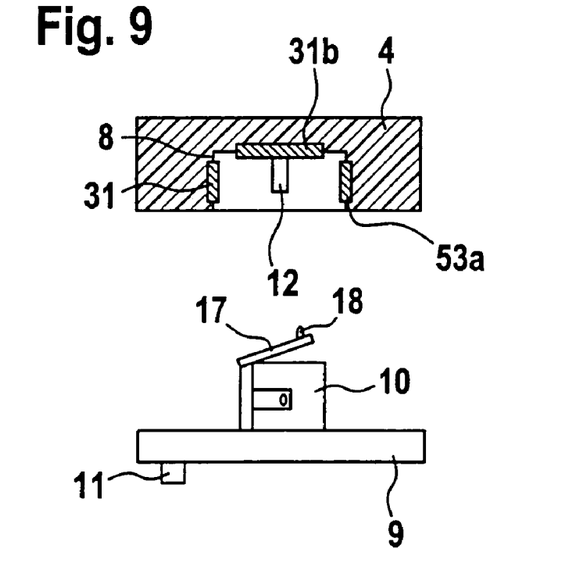
FIG. 9 is a schematic cross sectional view of a variant of the contact system shown in FIGS. 7 and 8.
Figure 10:
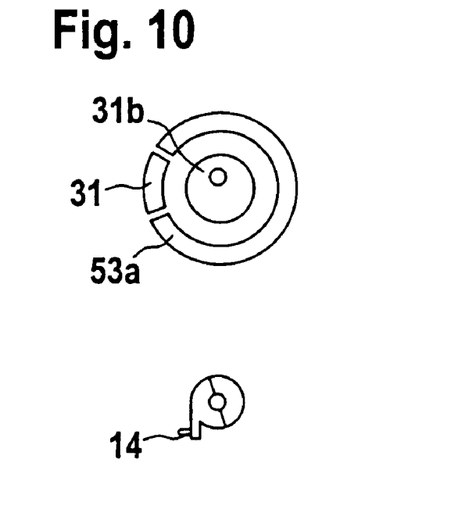
FIG. 10 is a top view of the contact system shown in FIG. 9.

FIGS. 9 and 10 show a variant of the embodiment depicted in FIGS. 6 to 8, in which the first contact track 13 and the spring washer 15 are replaced with a flexible contact element 17 having a point-like end 18 that directly contacts the associated contact track 31*b* in the contact sleeve 8. This measure as such may be used in other embodiments as well.

Figure 11:
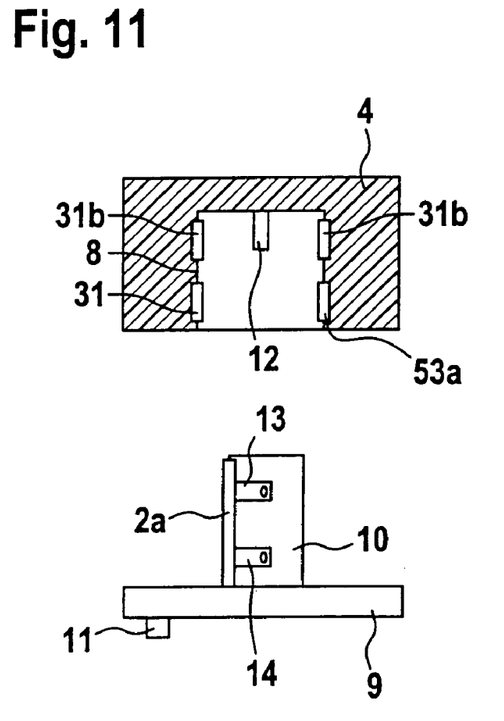
FIG. 11 is a schematic cross sectional view of another embodiment of the invention with a contact system having a contact sleeve and a driving disk.
Figure 12:
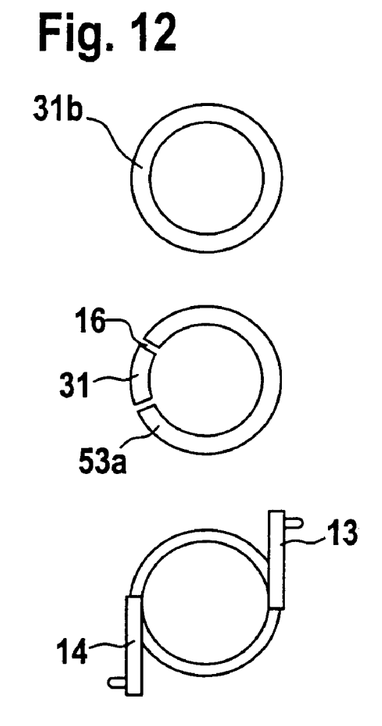
FIG. 12 is a top view of the contact system shown in FIG. 11.

FIGS. 11 and 12 show an embodiment in which the first contact track 31*b* is not formed on the inner end face as in the previous embodiments but annularly and uninterruptedly on a lateral surface of the contact sleeve 8. The second and third contact track 53*a* or 31 are likewise formed as an orbit along the inner lateral surface of the contact sleeve 8 but axially offset relative to the first contact track 31*b*. Accordingly, the first and second contact lugs 13 and 14 move along their parallel, offset orbits, such that the first contact track 31*b* is contacted continuously while the second and third contact tracks 53a and 31 are contacted alternately.

Other embodiments besides those depicted are feasible. For example, the embodiment shown in FIGS. 3 to 5 could be modified by replacing the flat contact track 31b disposed on the inner end face with an annular orbit provided along the inner lateral surface of the contact sleeve 8.

The invention claimed is:

1. Drive device for a windshield wiper having an output gearwheel (6), a gear cover (4) on which a plastic sleeve open toward the output gearwheel (6) is formed and a park position switch comprising first contacts which are mounted for rotation and are thus in sliding contact with second contacts fixed to the gear cover (4), wherein the first contacts are connected to the output gearwheel (6) via a driving disk, wherein the first contacts include contact lugs (13, 14), wherein the second contacts include contact tracks (31b, 53a, 31), and wherein, the sleeve is embodied as a contact sleeve (8) for contacting the contact lugs, wherein the contact tracks (31b, 53a, 31) are provided on the contact sleeve (8) and at least one of the contact tracks (31b, 53a, 31) is disposed on the inner surface of the contact sleeve (8), the driving disk (9) includes a cylindrical member (10) mounted in the center and at least one of the contact lugs (13, 14) is formed on the surface of the cylindrical member (10), and the cylindrical member (10) extends into the contact sleeve (8) such that the contact lugs (13, 14) of the driving disk (9) which rotates together with the output gearwheel (6) slidingly engage with the contact tracks (31b, 53a, 31).

2. Drive device according to claim 1, characterized in that, the contact sleeve (8) has three contact tracks (31b, 53a, 31) and the driving disk (9) has two electrically interconnected contact lugs (13, 14) which are configured and disposed in such a way that as the driving disk (9) rotates, a first contact lug (13) slides continuously on a first contact track (31b) and a second contact lug (14) slides alternately on a second and a third contact track (53a, 31) of the contact sleeve (8).

3. Drive device according to claim 2, characterized in that the second and third contact tracks (53a, 31) are segments interrupted only by mutual insulation (16) of an annular orbit along which the second contact lug (14) moves slidingly and alternately contacts the second and third contact tracks (53a, 31).

4. Drive device according to claim 3, characterized in that the second and third contact tracks (53a, 31) are formed as an annular orbit that is disposed on the open rim (8a) of the contact sleeve (8) and is interrupted only by mutual insulation (16), and the second contact lug (14) associated with the second and third contact tracks (53a, 31) extends axially from the surface of the driving disk (9) far enough toward the rim area (8b) of the contact sleeve (8) that it moves along the orbit as the driving disk (9) rotates and alternately slides on the second and third contact tracks (53a, 31).

5. Drive device according to claim 4, characterized in that the first contact track (31b) is formed on an inner end face of the contact sleeve 8 and the associated first contact lug (13) on the top surface of the cylindrical member (10).

6. Drive device according to claim 3, characterized in that all three contact tracks (31b, 53a, 31) are disposed on the inner surface of the contact sleeve (8) and both contact lugs (13, 14) are formed on the surface of the cylindrical member (10).

7. Drive device according to claim 6, characterized in that, the second and third contact tracks (53a, 31) are formed on an inner lateral surface of the contact sleeve (8) so that they run about the axis of the contact sleeve and are configured as an annular orbit that is interrupted only by mutual insulation (16), and the second contact lug (14) associated with the second and third contact tracks (53a, 31) is formed on the lateral surface of the cylindrical member (10) and is disposed in such a way that it moves along the orbit as the driving disk (9) rotates and alternately slides along the second and third contact tracks (53a, 31).

8. Drive device according to claim 7, characterized in that the first contact track (31b) is formed on an inner end face of the contact sleeve 8 and the associated first contact lug (13) on the top surface of the cylindrical member (10).

9. Drive device according to claim 6, characterized in that, the first contact track (31b) is formed on an inner lateral surface of the contact sleeve (8) and is annularly closed about the axis of the contact sleeve, the second and third contact tracks (53a, 31) are formed on an inner lateral surface of the contact sleeve (8), running axially offset relative to the first contact track (31b), about the axis of the contact sleeve (8), in the form of an annular orbit that is interrupted only by mutual insulation (16), the first contact lug (13) associated with the first contact track (31b) is formed on the lateral surface of the cylindrical member (10) and is disposed in such a way that it moves along the annularly closed first contact track (31b) as the driving disk (9) rotates and thereby continuously slides on the first contact track (31b), and the second contact lug (14) associated with the second and third contact paths (53a, 31) is formed on the lateral surface of the cylindrical member (10) and is disposed in such a way that it moves along the orbit as the driving disk (9) rotates and alternately slides on the second and third contact paths (53a, 31).

10. Drive device according to claim 6, characterized in that the first contact track (31b) is formed on an inner end face of the contact sleeve 8 and the associated first contact lug (13) on the top surface of the cylindrical member (10).

11. Drive device according to claim 3, characterized in that the first contact track (31b) is formed on an inner end face of the contact sleeve 8 and the associated first contact lug (13) on the top surface of the cylindrical member (10).

12. Drive device according to claim 2, characterized in that all three contact tracks (31b, 53a, 31) are disposed on the inner surface of the contact sleeve (8) and both contact lugs (13, 14) are formed on the surface of the cylindrical member (10).

13. Drive device according to claim 12, characterized in that, the second and third contact tracks (53a, 31) are formed on an inner lateral surface of the contact sleeve (8) 50 that they run about the axis of the contact sleeve and are configured as an annular orbit that is interrupted only by mutual insulation (16), and the second contact lug (14) associated with the second and third contact tracks (53a, 31) is formed on the lateral surface of the cylindrical member (10) and is disposed in such a way that it moves along the orbit as the driving disk (9) rotates and alternately slides along the second and third contact tracks (53a, 31).

14. Drive device according to claim 13, characterized in that the first contact track (31b) is formed on an inner end face of the contact sleeve 8 and the associated first contact lug (13) on the top surface of the cylindrical member (10).

15. Drive device according to claim 12, characterized in that, the first contact track (31*b*) is formed on an inner lateral surface of the contact sleeve (8) and is annularly closed about the axis of the contact sleeve, the second and third contact tracks (53*a*, 31) are formed on an inner lateral surface of the contact sleeve (8), running axially offset relative to the first contact track (31*b*), about the axis of the contact sleeve (8), in the form of an annular orbit that is interrupted only by mutual insulation (16), the first contact lug (13) associated with the first contact track (31*b*) is formed on the lateral surface of the cylindrical member (10) and is disposed in such a way that it moves along the annularly closed first contact track (31*b*) as the driving disk (9) rotates and thereby continuously slides on the first contact track (31*b*), and the second contact lug (14) associated with the second and third contact tracks (53*a*, 31) is formed on the lateral surface of the cylindrical member (10) and is disposed in such a way that it moves along the orbit as the driving disk (9) rotates and alternately slides on the second and third contact tracks (53*a*, 31).

16. Drive device according to claim 12, characterized in that the first contact track (31*b*) is formed on an inner end face of the contact sleeve 8 and the associated first contact lug (13) on the top surface of the cylindrical member (10).

17. Drive device according to claim 2, characterized in that the first contact track (31*b*) is formed on an inner end face of the contact sleeve 8 and the associated first contact lug (13) on the top surface of the cylindrical member (10).

18. Drive device according to claim 17, characterized in that the first contact lug (13) is flat and formed on the top surface of the cylindrical member (10) and contacts the first contact track (31*b*) by means of an intervening flat contact spring (15).

19. Drive device according to claim 1, characterized in that the first and/or second contact lug (13, 14) comprises a flexible contact element (17) with a point-like end (18) that directly contacts the associated contact track (31*b*, 53*a*, 31).

* * * * *